(12) United States Patent
Imai et al.

(10) Patent No.: US 11,422,914 B2
(45) Date of Patent: Aug. 23, 2022

(54) METADATA GENERATION APPARATUS, METADATA GENERATION METHOD, AND PROGRAM

(71) Applicant: OMRON Corporation, Kyoto (JP)

(72) Inventors: Hiroshi Imai, Ikoma (JP); Tetsuji Yamato, Yokohama (JP); Taiji Yoshikawa, Kizugawa (JP)

(73) Assignee: OMRON Corporation, Kyoto (JP)

( * ) Notice: Subject to any disclaimer, the term of this patent is extended or adjusted under 35 U.S.C. 154(b) by 168 days.

(21) Appl. No.: 16/964,244

(22) PCT Filed: Nov. 29, 2018

(86) PCT No.: PCT/JP2018/043935
§ 371 (c)(1),
(2) Date: Jul. 23, 2020

(87) PCT Pub. No.: WO2019/167366
PCT Pub. Date: Sep. 6, 2019

(65) Prior Publication Data
US 2021/0042206 A1    Feb. 11, 2021

(30) Foreign Application Priority Data

Feb. 27, 2018   (JP) .............................. JP2018-033042

(51) Int. Cl.
*G06F 11/34* (2006.01)
*G06F 16/908* (2019.01)
(Continued)

(52) U.S. Cl.
CPC ...... *G06F 11/3452* (2013.01); *G06F 11/3058* (2013.01); *G06F 11/3089* (2013.01);
(Continued)

(58) Field of Classification Search
CPC .. G06F 11/34; G06F 11/3452; G06F 11/3058; G06F 11/3089; G06F 16/908; G16Y 40/10; G16Y 40/35; H04Q 9/00
See application file for complete search history.

(56) References Cited

U.S. PATENT DOCUMENTS

| 6,108,619 A | 8/2000 | Carter et al. |
| 2011/0054806 A1* | 3/2011 | Goldfine ................. G07C 3/00 702/34 |

(Continued)

FOREIGN PATENT DOCUMENTS

| CN | 101369281 A | 2/2009 |
| CN | 101718634 A | 6/2010 |

(Continued)

OTHER PUBLICATIONS

Sara Hachem in Probabilistic Registration for Large-Scale Mobile Participatory Sensing, 2013 IEEE International Conference on Pervasive Computing and Communications (PerCom), San Diego (Mar. 18-22, 2013), pp. 132-140 (Year: 2013).*

(Continued)

*Primary Examiner* — Tung S Lau
(74) *Attorney, Agent, or Firm* — Metrolex IP Law Group, PLLC

(57) ABSTRACT

A metadata generation apparatus capable of generating metadata, as well as a metadata generation method and program are provided. The sensing device is configured to generate an output value based on a physical amount that is input. The metadata generation apparatus includes a probability density function generation unit and a metadata generation unit. The probability density function generation unit is configured to generate a probability density function of an output value when a specific physical amount is input to the sensing device. The metadata generation unit is
(Continued)

configured to generate metadata based on the probability density function.

10 Claims, 13 Drawing Sheets

(51) Int. Cl.
  *G16Y 40/10* (2020.01)
  *G16Y 40/35* (2020.01)
  *G06F 11/30* (2006.01)
(52) U.S. Cl.
  CPC ............ *G06F 16/908* (2019.01); *G16Y 40/10* (2020.01); *G16Y 40/35* (2020.01)

(56) References Cited

U.S. PATENT DOCUMENTS

| | | | |
|---|---|---|---|
| 2011/0060568 A1* | 3/2011 | Goldfine | G07C 3/00 702/34 |
| 2011/0208897 A1* | 8/2011 | Lee | G11C 11/5642 711/E12.001 |
| 2012/0296899 A1* | 11/2012 | Adams | G16H 10/40 707/736 |
| 2014/0201369 A1 | 7/2014 | Maeda et al. | |
| 2016/0146973 A1* | 5/2016 | Johnson | G01V 1/306 702/2 |
| 2016/0299902 A1 | 10/2016 | Uenoyama et al. | |

FOREIGN PATENT DOCUMENTS

| | | |
|---|---|---|
| CN | 106710653 A | 5/2017 |
| JP | 2006-343124 A | 12/2006 |
| JP | 2013-36887 A | 2/2013 |
| KR | 10-2018-0013010 A | 2/2018 |
| WO | 2015/128954 A1 | 9/2015 |

OTHER PUBLICATIONS

Chinese Office Action dated Sep. 27, 2021 for the counterpart Chinese patent application.
An English translation of the International Search Report ("ISR") of PCT/JP2018/043935 dated Dec. 25, 2018.
The Written Opinion("WO") of PCT/JP2018/043935 dated Dec. 25, 2018.

* cited by examiner

METADATA GENERATION APPARATUS, METADATA GENERATION METHOD, AND PROGRAM

TECHNICAL FIELD

The present invention relates to a metadata generation apparatus, a metadata generation method, and a program.

RELATED ART

International Publication No. WO2015/128954 (Patent Document 1) discloses a device network system that includes a device network and a device management system that manages devices (e.g., sensors) included in the device network. In the device management system, a physical device master DB (database) for managing attribute information of the devices included in the device network is provided. The user can search for a device that has desired attributes from among the plurality of devices included in the device network by referencing the physical device master DB (see Patent Document 1).

RELATED ART DOCUMENTS

Patent Document

Patent Document 1: International Publication No. WO2015/128954

SUMMARY OF THE INVENTION

Problem to be Solved by the Invention

In Patent Document 1 above, information indicating the "type", the "installation location", and the like of each of the devices are managed using the physical device master DB. Accordingly, it can be said that, in the physical device master DB, information indicating a "type" and an "installation location" is added to each of the devices as metadata. The user can search for a device that satisfies a desired condition with respect to the "type" and the "installation location", by referring to the metadata, for example.

Each sensing device is provided with a data sheet corresponding to the "model number" of a "manufacturer", for example. In most cases, the data sheet includes information indicating the correspondence relation (hereinafter, also referred to as "input/output relationship") between a physical amount that is input to the sensing device and an output value of the sensing device when the physical amount is input (hereinafter, the information is also referred to as "input/output relationship information"). The present inventor has found that adding input/output relationship information to each sensing device as metadata is effective for searching for a sensing device that has the desired input/output relationship, for example.

However, the input/output relationship information included in each data sheet is merely representative. Therefore, even if the "manufacturer" and "model number" are the same, each sensing device may have a different input/output relationship, in the strict sense. In addition, even when the same physical amount is input to the same sensing device, a different value may be output by the sensing device (output value may vary) due to various factors (installation state, surrounding environment, and the like of the sensing device). Accordingly, the input/output relationship information included in the data sheets does not necessarily indicate the input/output relationship of the sensing device with high accuracy.

The present invention has been made in order to solve such a problem, and aims to provide a metadata generation apparatus capable of generating metadata that more accurately indicates the input/output relationship of each sensing device, as well as a metadata generation method and program.

Means for Solving the Problems

A metadata generation apparatus according to an aspect of the present invention is configured to generate metadata that is associated with a sensing device. The sensing device is configured to generate an output value based on a physical amount that is input. The metadata generation apparatus includes a probability density function generation unit and a metadata generation unit. The probability density function generation unit is configured to generate a probability density function of an output value when a specific physical amount is input to the sensing device. The metadata generation unit is configured to generate metadata based on the probability density function.

In this metadata generation apparatus, metadata is generated based on a probability density function of an output value of a sensing device when a specific physical amount is input. The probability density function sufficiently represents the difference in input/output relationship between sensing devices that have the same model number, and variation in output value of the same sensing device. Therefore, with this metadata generation apparatus, it is possible to generate metadata that more accurately indicates the input/output relationship of each sensing device.

In addition, in the above-described metadata generation apparatus, the probability density function generation unit may be configured to generate a plurality of probability density functions. Each of the plurality of probability density functions may be a probability density function of an output value when a specific physical amount that is different from a specific physical amount input to the sensing device when another probability density function included in the plurality of probability density functions was generated is input to the sensing device.

In this metadata generation apparatus, a probability density function of an output value is generated for each physical amount (input value), and metadata is generated based on a plurality of generated probability density functions. Therefore, with this metadata generation apparatus, it is possible to generate metadata that more specifically indicates the input/output relationship of each sensing device.

In addition, the above-described metadata generation apparatus may further include a physical amount specifying unit configured to specify a physical amount that is input to the sensing device more accurately than the sensing device. The probability density function generation unit may be configured to generate a probability density function based on the physical amount specified by the physical amount specifying unit and an output value.

In this metadata generation apparatus, a physical amount that is input to the sensing device by the physical amount specifying unit is specified, and a physical amount is more accurately specified by the physical amount specifying unit than the sensing device. Therefore, with this metadata generation apparatus, a physical amount that is input to the sensing device is accurately specified, and thus it is possible to accurately specify the input/output relationship of the sensing device.

In addition, the sensing device may be installed in an actual use environment.

With this metadata generation apparatus, it is possible to generate metadata indicating the input/output relationship of the sensing device in the actual use environment.

In addition, in a metadata generation method according to another aspect of the present invention, metadata that is associated with a sensing device is generated. The sensing device is configured to generate an output value based on a physical amount that is input. The metadata generation method includes a step of generating a probability density function of an output value when a specific physical amount is input to the sensing device and a step of generating metadata based on the probability density function.

In this metadata generation method, metadata is generated based on a probability density function of an output value of a sensing device when a specific physical amount is input. The probability density function sufficiently represents the difference in input/output relationship between sensing devices, and variation in output value of the same sensing device. Therefore, with this metadata generation method, it is possible to generate metadata that more accurately indicates the input/output relationship of each sensing device.

In addition, a program according to another aspect of the present invention causes a computer to execute processing for generating metadata that is associated with a sensing device. The sensing device is configured to generate an output value based on a physical amount that is input. The program is configured to cause the computer to execute a step of generating a probability density function of an output value when a specific physical amount is input to the sensing device and a step of generating metadata based on the probability density function.

When this program is executed by a computer, metadata is generated based on a probability density function of an output value of a sensing device when a specific physical amount is input. The probability density function sufficiently represents the difference in input/output relationship between sensing devices, and variation in output value of the same sensing device. Therefore, with this program, it is possible to generate metadata that more accurately indicates the input/output relationship of each sensing device.

Effects of the Invention

According to the present invention, it is possible to provide a metadata generation apparatus capable of generating metadata that more accurately indicates the input/output relationship of each sensing device, as well as a metadata generation method and program.

EMBODIMENTS OF THE INVENTION

Figure 1:
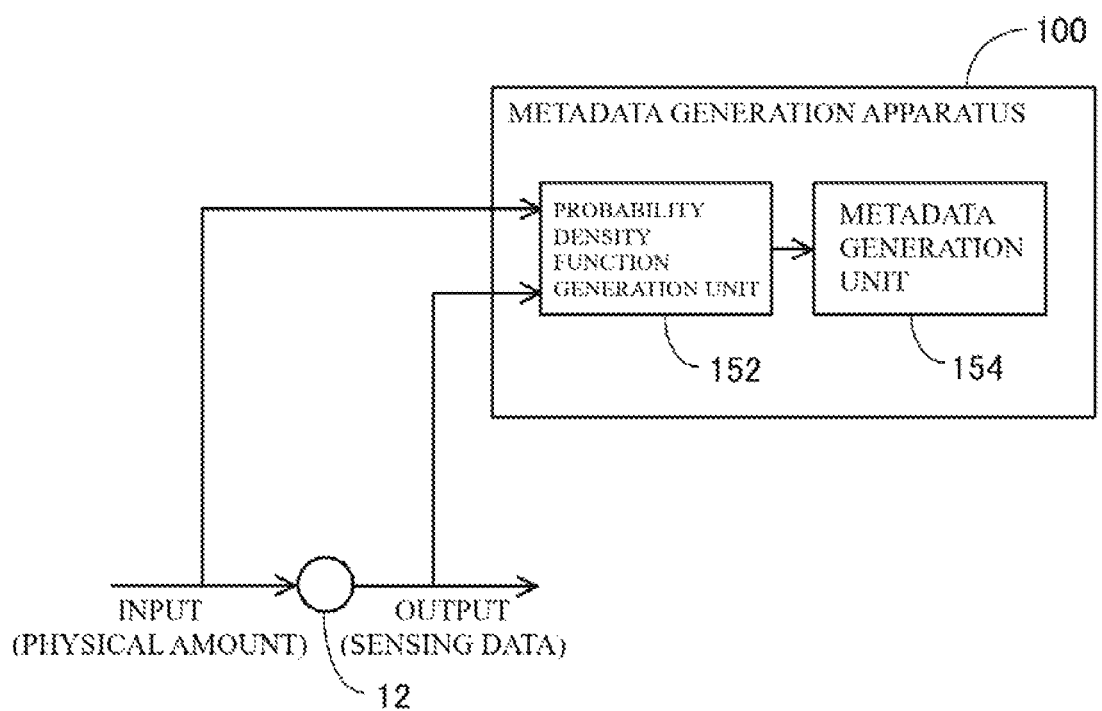
FIG. 1 is a diagram illustrating an overview of a metadata generation apparatus.

An embodiment according to an aspect of the present invention (hereinafter, also referred to as "the embodiment") will be described below in detail with reference to drawings. Note that, in the drawings, the same reference numerals are given to the same or equivalent constituent elements, and a description thereof is not repeated. In addition, the embodiment described below is only an example of the present invention in all respects. Various modifications and changes can be made to the embodiment within the scope of the present invention. Accordingly, when implementing the present invention, a specific configuration can be adopted as appropriate according to an embodiment.

1. Overview

FIG. 1 is a diagram illustrating an overview of a metadata generation apparatus 100 according to this embodiment. As shown in FIG. 1, a sensing device 12 generates sensing data based on a physical amount (e.g., a temperature, humidity, sound pressure, a speed, or acceleration) that is input, and outputs the generated sensing data (an output value).

Consider a case where some sensing devices 12 are selected from a plurality of sensing devices 12, and a desired virtual sensor is generated, for example. The virtual sensor is a sensor module that outputs, based on sensing data generated by the input sensor (for example, a sensing device 12) observing a target (object), a result of observing a target that is different from the target observed by the input sensor, as sensing data. The virtual sensor is constituted by one or more sensing devices 12 and a processing module (to be described later), for example. The processing module includes a plurality of input ports, and sensing data output by the sensing devices 12 is input to the input ports, for example. The processing module is configured to generate output data that is different from input sensing data (hereinafter, also referred to as "input data") based on the input data.

In order to generate a desired virtual sensor, it is important to select an appropriate sensing device 12 as an input sensor of the processing module. That is to say, it is important to retrieve an appropriate sensing device 12 from a plurality of sensing devices 12. In addition, it is conceivable that, in addition to generation of a virtual sensor, there are a large number of scenarios in which it is important to retrieve an appropriate sensing device 12 from a plurality of sensing devices 12.

In order to easily retrieve an appropriate sensing device 12, it is conceivable that metadata indicating the attributes of the sensing devices 12 is associated with the sensing devices 12. When such metadata is associated with the sensing devices 12, an appropriate sensing device 12 can be searched for simply by referring to the metadata, for example. One of the important attributes of each sensing device 12 is the correspondence relation (input/output relationship) between a physical amount that is input to the sensing device 12 and an output value of the sensing device 12 when the physical amount is input.

Each sensing device 12 is provided with a data sheet based on the "model number" of the "manufacturer". Each data sheet includes input/output relationship information of the sensing device 12 in most cases. The present inventor has found that adding input/output relationship information to sensing devices 12 as metadata is effective for searching for a sensing device 12 that has desired input/output relationship, for example.

However, the input/output relationship information included in each data sheet is merely representative. Therefore, even if the "manufacturer" and "model number" are the same, each sensing device may have a different input/output relationship, in the strict sense. In addition, even when the same physical amount is input to the same sensing device 12, a different value may be output by the sensing device (output value may vary) due to various factors (the installation state, a surrounding environment, and the like of the sensing device 12). Accordingly, the input/output relationship information included in each data sheet does not necessarily indicate the input/output relationship of the sensing device with high accuracy.

The metadata generation apparatus 100 according to this embodiment includes a probability density function generation unit 152 and a metadata generation unit 154. The probability density function generation unit 152 is configured to generate a probability density function of an output value when a specific physical amount is input to each sensing device 12. The metadata generation unit 154 is configured to generate metadata based on a probability density function generated by the probability density function generation unit 152. Accordingly, the metadata generation apparatus 100 generates metadata of the sensing device 12 based on the probability density function of an output value of the sensing device 12 when a specific physical amount is input. The probability density function sufficiently represents the difference in input/output relationship between sensing devices 12 that have the same model number, and variation in an output value of the same sensing device 12. Therefore, with the metadata generation apparatus 100, it is possible to generate metadata that more accurately indicates the input/output relationship of each sensing device 12.

2. Configuration

2-1. Overall System Configuration

Figure 2:
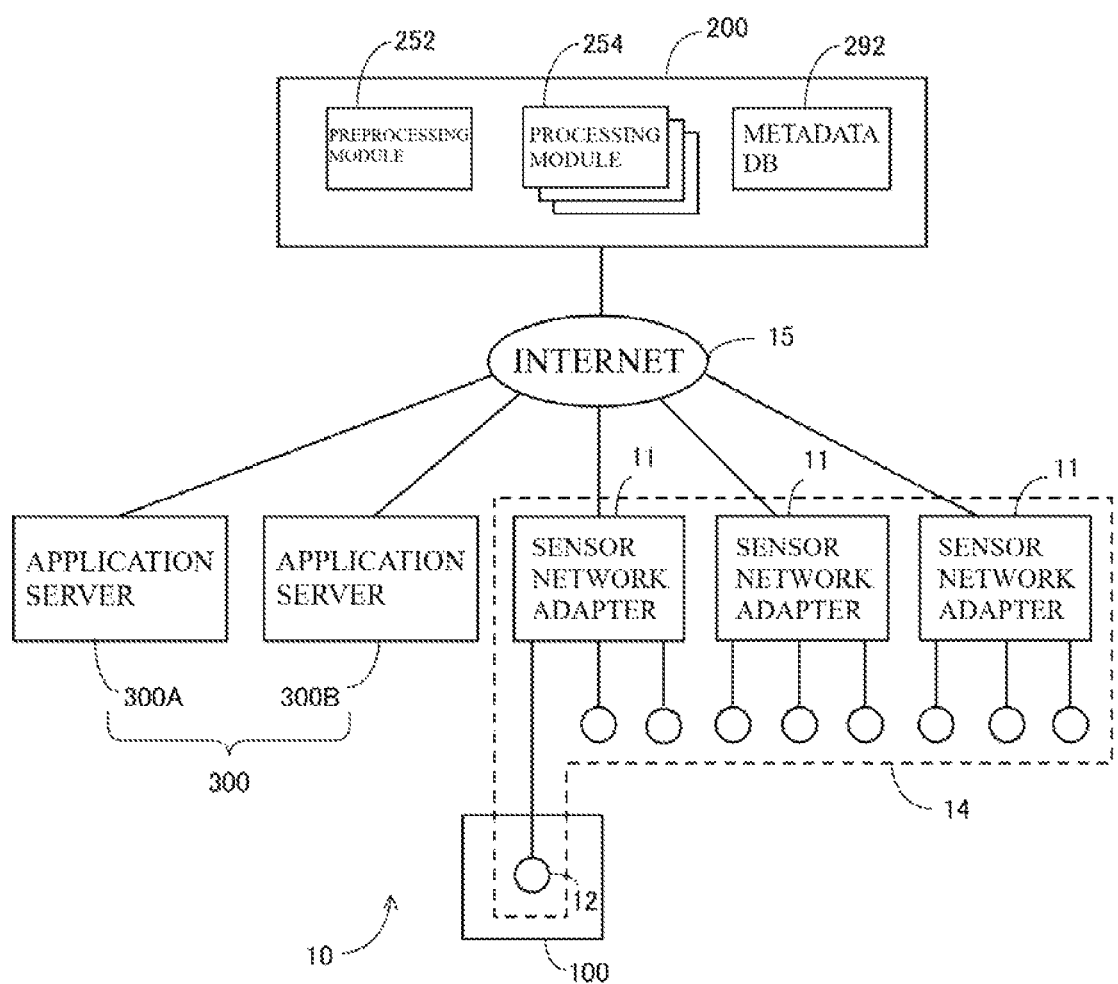
FIG. 2 is a diagram showing an example of a sensor network system.

FIG. 2 is a diagram showing an example of a sensor network system 10 that includes the metadata generation apparatus 100 according to this embodiment. In the example in FIG. 2, the sensor network system 10 includes a sensor network unit 14, the metadata generation apparatus 100, a sensor management server 200, and application servers 300.

The sensor network unit 14, the metadata generation apparatus 100, the sensor management server 200, and the application servers 300 are connected via the Internet 15 so that they can communicate with each other. Note that the numbers of constituent elements included in the sensor network system 10 (the number of sensor management servers 200, the number of application servers 300, the number of sensor network adapters 11, the number of sensing devices 12, the number of metadata generation apparatuses 100, and the like) are not limited to those shown in FIG. 2.

Sensing data generated by the sensing devices 12 can be distributed in the sensor network system 10. For example, sensing data generated by the sensing devices 12 can be distributed to the sensor management server 200, and sensing data generated by a virtual sensor (generated by the sensor management server 200) can be distributed to the application servers 300.

The sensor network unit 14 includes a plurality of the sensor network adapters 11, for example. A plurality of sensing devices 12 are connected to each of the plurality of sensor network adapters 11, and the sensing devices 12 are connected to the Internet 15 via the sensor network adapters 11.

The sensing devices 12 are configured to obtain sensing data by observing a target. The sensing devices 12 may be image sensors (cameras), temperature sensors, humidity sensors, illuminance sensors, force sensors, audio sensors, speed sensors, acceleration sensors, RFID (radio frequency identification) sensors, infrared sensors, posture sensors, rainfall sensors, radiation sensors, and/or gas sensors, for example. Also, the sensing devices 12 do not necessarily need to be fixed, and may also be mobile devices such as a mobile phone, a smartphone and a tablet. Each of the sensing devices 12 does not necessarily need to be constituted by a single sensor, and may also be constituted by a plurality of sensors. Moreover, the sensing devices 12 may be installed for any purpose, and may be installed for FA (factory automation) and production management in a factory, urban traffic control, environment measurements such as weather measurements, healthcare, crime-prevention, or the like.

In the sensor network unit 14, the sensor network adapters 11 are arranged at separate (far) locations, and sensing devices 12 connected to each of the sensor network adapters 11 are arranged at the same (close) locations, for example, but the arrangement locations of these are not limited thereto.

The metadata generation apparatus 100 is configured to generate metadata that is associated with the sensing devices 12. The sensing devices 12 may be accommodated in a metadata generation apparatus 100 at the time of shipment of the sensing device 12, installation of the sensing device 12 in a use environment, or maintenance of the sensing device 12, for example. The metadata generation apparatus 100 generates metadata of the sensing devices 12, when the sensing devices 12 are accommodated therein. The metadata indicates the input/output relationship of the sensing device 12, for example. The generated metadata is, for example, transmitted to the sensor management server 200 via the Internet 15, and registered in a metadata DB 292 (to be described later). The content of the metadata and a metadata generation method will be described later in detail.

The application servers 300 (300A, 300B) are each configured to execute an application that uses sensing data, and is realized by a general-purpose computer, for example. The application servers 300 obtain necessary sensing data via the Internet 15.

The sensor management server 200 is a server for realizing a virtual sensor, and managing the sensing device 12. In the sensor management server 200, a plurality of processing modules 254 and a preprocessing module 252 are realized, and the metadata DB 292 is managed. The plurality of processing modules 254 and the preprocessing module 252 may be software modules, for example.

As described above, the processing modules 254 include at least one input port, and is configured to generate, based on input data input to the input port, output data that is different from the input data. The processing module 254 can switch a sensing device 12 that outputs input data to the input port as necessary. If, for example, the sensing device 12 that is currently outputting input data to the input port is broken, the processing module 254 can switch the input sensor to another sensing device 12.

A processing module 254 may also be configured to output data indicating the number of persons that are present in a room, based on input data (sound data) that is output by an audio sensor disposed in the room, for example. In this case, a virtual sensor that detects the number of persons in the room can be realized by the processing module 254 and the sensing device 12 (audio sensor).

The preprocessing module 252 is configured to perform preprocessing on input data that is input to the processing modules 254. The metadata DB 292 is configured to manage metadata associated with the sensing devices 12 included in the sensor network unit 14.

In the sensor management server 200, the preprocessing module 252 determines whether or not to perform preprocessing on input data that is input to the processing modules 254, by referring to the metadata DB 292, for example. Each software module and the metadata DB 292 will be described later in detail.

In addition, metadata that is managed in the metadata DB 292 may also be used for selecting a sensing device 12 that outputs sensing data to the processing modules 254, or may also be used for optimizing weighting of a plurality of pieces of input data in the processing modules 254, for example. Accordingly, various forms are conceivable as uses of this metadata.

2-2. Hardware Configuration of Metadata Generation Apparatus

Figure 3:
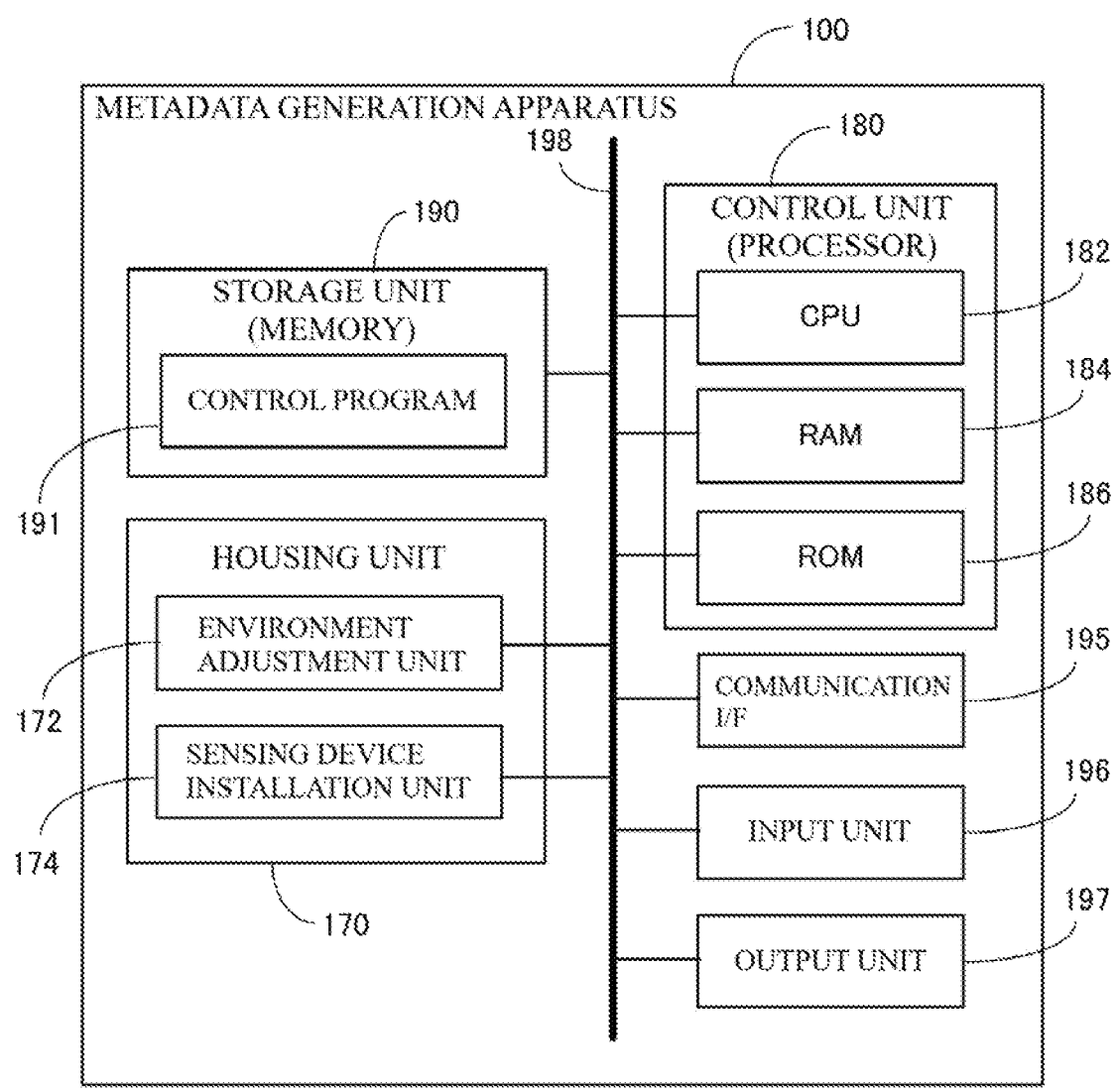
FIG. 3 is a diagram showing an example of the hardware configuration of the metadata generation apparatus.

FIG. 3 is a diagram showing an example of the hardware configuration of the metadata generation apparatus 100. Note that, according to this embodiment, the metadata generation apparatus 100 is realized, for example, by a housing unit that accommodates the sensing devices 12 and a general-purpose computer that adjusts the internal environment of the housing unit.

In the example in FIG. 3, the metadata generation apparatus 100 includes a housing unit 170, a control unit 180, a communication I/F (interface) 195, an input unit 196, an output unit 197, and a storage unit 190, and those constituent elements are electrically connected via a bus 198.

The housing unit 170 is configured to form a sealed space therein, and the sensing devices 12 are accommodated in the sealed space. The housing unit 170 is a box-shaped member that can form a sealed space therein, for example. The housing unit 170 includes an environment adjustment unit 172 and a sensing device installation unit 174.

The environment adjustment unit 172 is configured to adjust the internal environment of the housing unit 170. The environment adjustment unit 172 adjusts the temperature in the housing unit 170 to a temperature indicated in an instruction from the control unit 180, for example. The environment adjustment unit 172 includes an air conditioning device, for example. In addition, the sensing device installation unit 174 is configured to be capable of electrically connecting the sensing devices 12. When installed in the sensing device installation unit 174, the sensing devices 12 output sensing data to the control unit 180 via the bus 198.

The control unit 180 includes a CPU (central processing unit) 182, a RAM (random access memory) 184, a ROM (read only memory) 186, and the like, and is configured to control the constituent elements in accordance with information processing.

The communication I/F 195 is configured to communicate with an external apparatus (e.g., the sensor management server 200 (FIG. 2)) provided outside of the metadata generation apparatus 100, via the Internet 15. The communication I/F 195 is constituted by a wired LAN (local area network) module or a wireless LAN module, for example.

The input unit 196 is constituted by input I/Fs such as a touch panel, a keyboard, and input buttons. The input unit 196 receives, from the user, an instruction to start generating metadata that is associated with the sensing devices 12 installed in the housing unit 170.

The output unit 197 is constituted by output I/Fs such as a display and a speaker. The output unit 197 is configured to output information regarding generated metadata (image output, sound output, and the like).

The storage unit 190 is a secondary storage device such as a hard disk drive or a solid state drive. The storage unit 190 is configured to store a control program 191, for example. The control program 191 is a control program of the metadata generation apparatus 100 that is executed by the control unit 180. The environment inside the housing unit 170 is adjusted as a result of the control unit 180 executing the control program 191, for example. When the control unit 180 executes the control program 191, the control program 191 is deployed to the RAM 184. The control unit 180 then controls constituent elements by causing the CPU 182 to interpret and execute the control program 191 deployed in the RAM 184.

2-3. Hardware Configuration of Sensor Management Server

Figure 4:
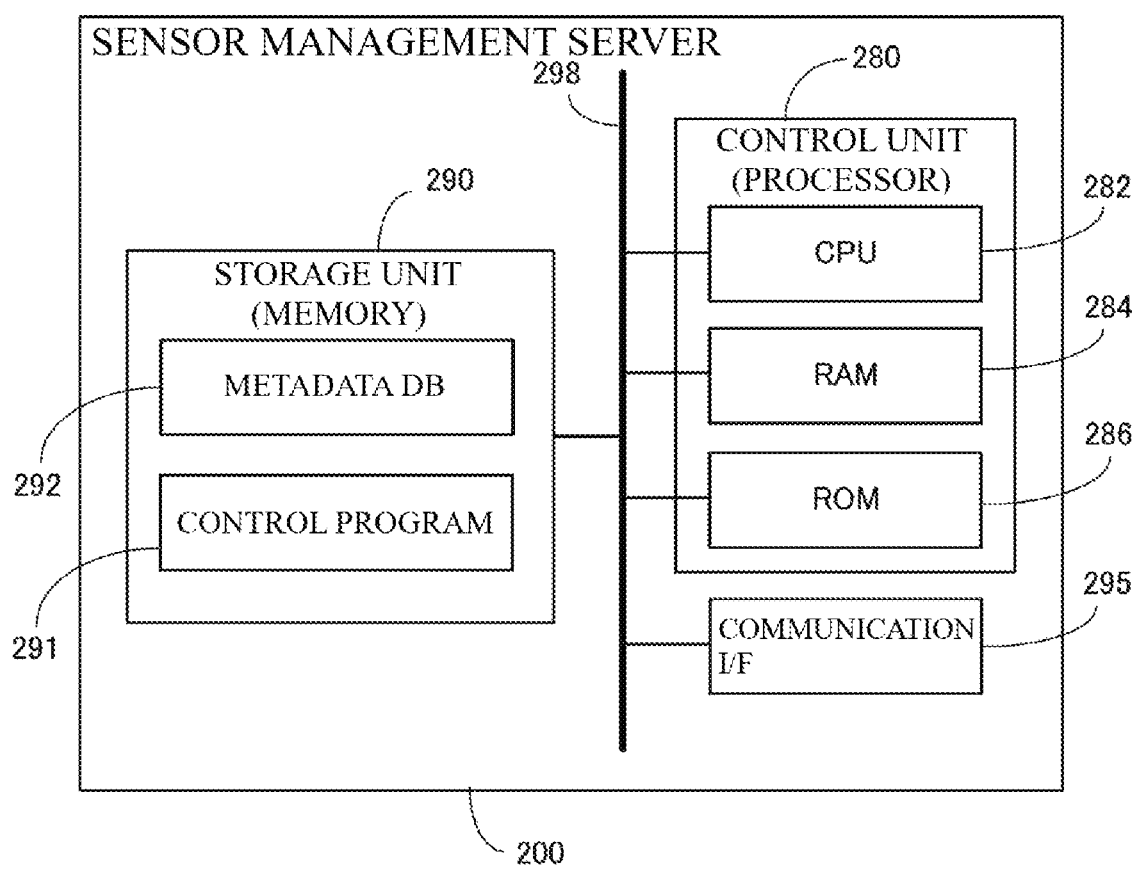
FIG. 4 is a diagram showing an example of the hardware configuration of the sensor management server.

FIG. 4 is a diagram showing an example of the hardware configuration of the sensor management server 200. Note that, according to this embodiment, the sensor management server 200 may be realized by a general-purpose computer, for example.

In the example in FIG. 4, the sensor management server 200 includes a control unit 280, a communication I/F 295, and a storage unit 290, and those constituent elements are electrically connected via a bus 298.

The control unit 280 includes a CPU 282, a RAM 284, a ROM 286, and the like, and is configured to control the constituent elements in accordance to information processing.

The communication I/F 295 is configured to communicate, via the Internet 15, with an external apparatus (e.g., the metadata generation apparatus 100, the application servers 300, and the sensor network unit 14 (FIG. 2)) provided outside of the sensor management server 200. The communication I/F 295 may be constituted by a wired LAN module or a wireless LAN module, for example.

The storage unit 290 is a secondary storage device such as a hard disk drive or a solid state drive. The storage unit 290 is configured to store the metadata DB 292 and a control program 291, for example.

The metadata DB 292 manages metadata of the sensing devices 12 included in the sensor network unit 14. The metadata that is managed by the metadata DB 292 is generated by the metadata generation apparatus 100, for example. As described above, the metadata generated by the metadata generation apparatus 100 indicates, for example, the correspondence relation (input/output relationship) between a physical amount that is input to each sensing device 12 and an output value of the sensing device 12 when the physical amount is input. The metadata will be described later in detail.

The control program 291 is a control program of the sensor management server 200 that is executed by the control unit 280. The processing modules 254 and the preprocessing module 252 (FIG. 2) may be realized as a result of the control unit 280 executing the control program 291, for example. When the control unit 280 executes the control program 291, the control program 291 is deployed in the RAM 284. The control unit 280 then controls the constituent elements as a result of the CPU 282 interpreting and executing the control program 291 deployed in the RAM 284.

2-4. Software Configuration of Metadata Generation Apparatus

Figure 5A:
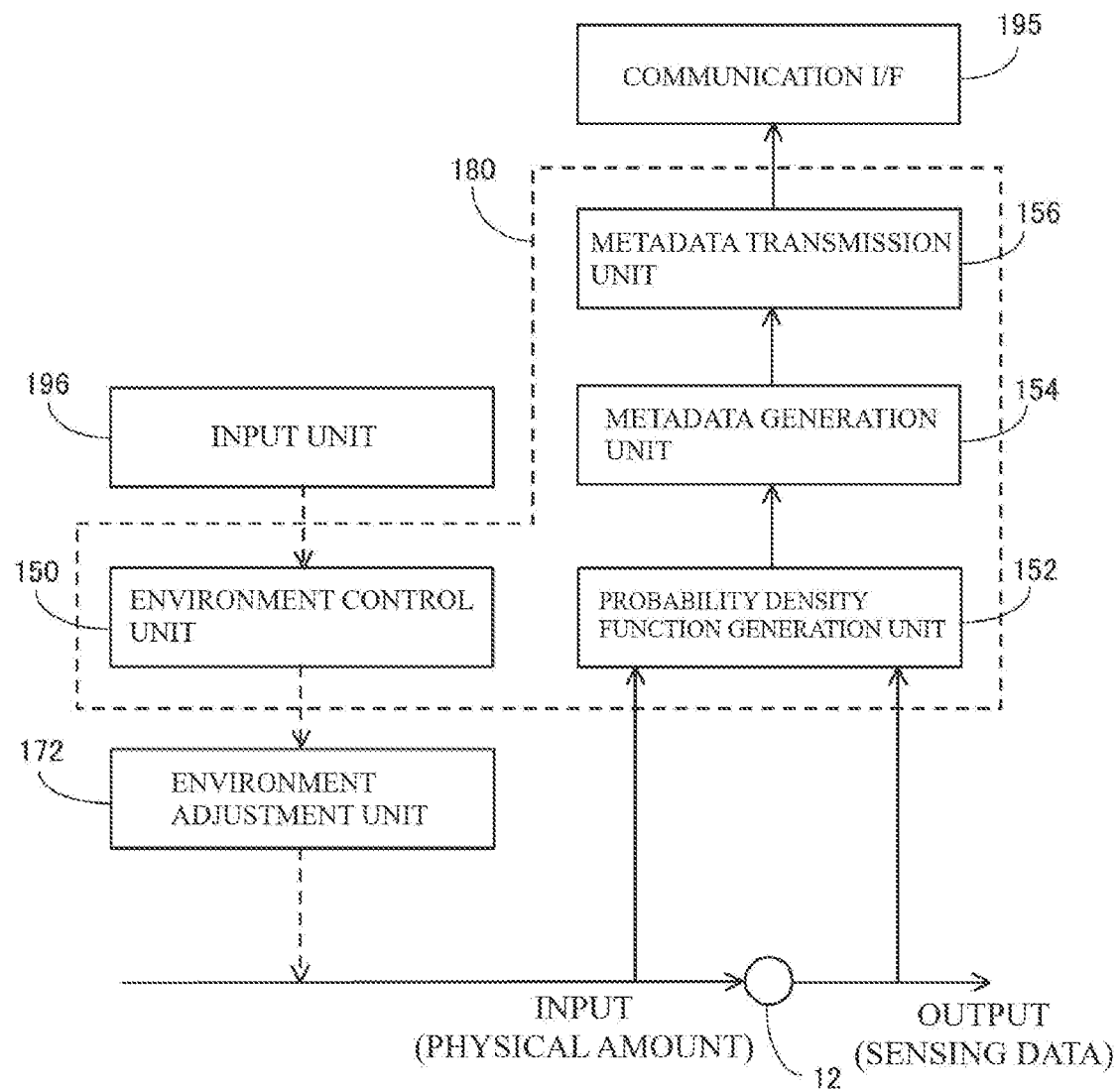
FIG. 5A is a diagram showing an example of the software configuration of the metadata generation apparatus.
Figure 5B:
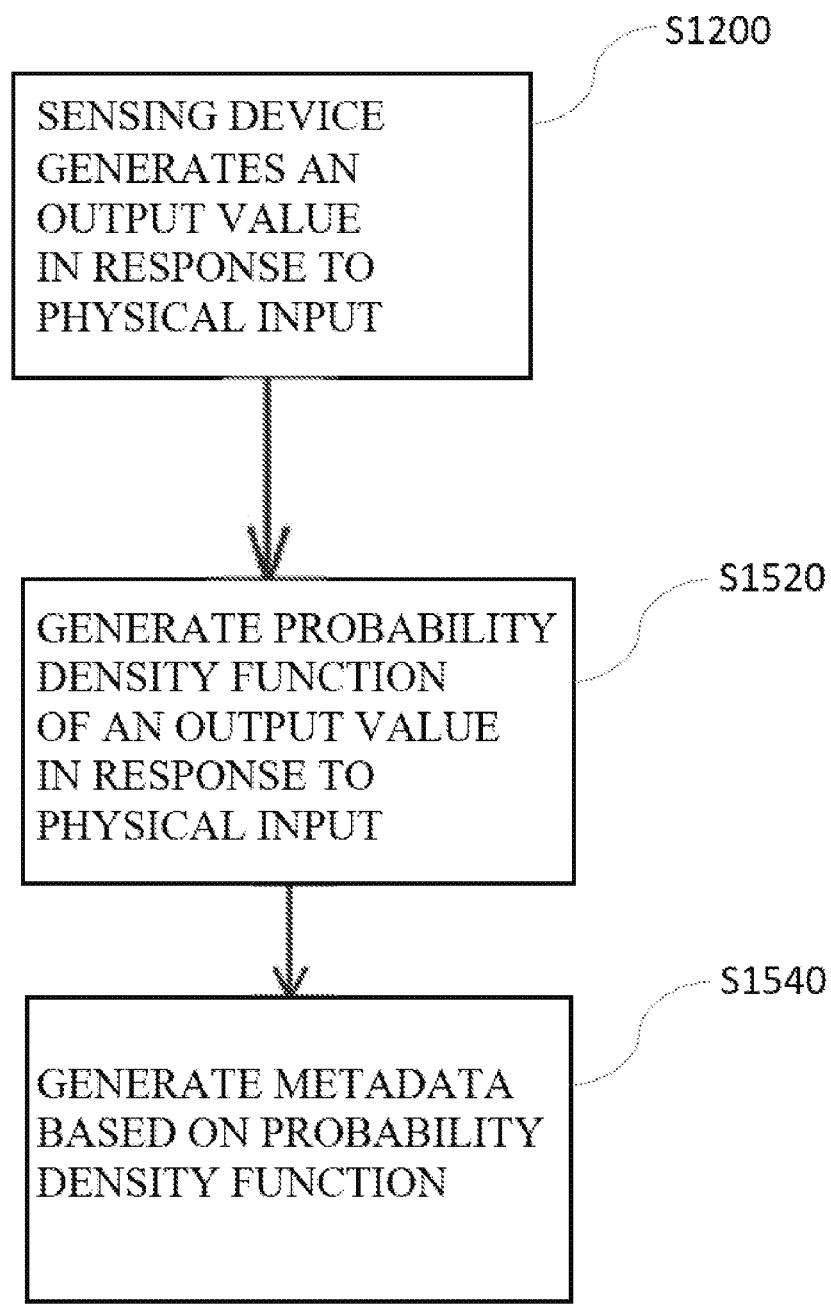
FIG. 5B is a flowchart showing an example of a metadata generation method.

FIG. 5A is a diagram showing an example of the software configuration of the metadata generation apparatus 100. In the example in FIG. 5A, an environment control unit 150, the probability density function generation unit 152, the metadata generation unit 154, and a metadata transmission unit 156 are realized as a result of the control unit 180 executing the control program 191 (FIG. 3). In one or more alternative or additional embodiments, a metadata generation method as shown in FIG. 5B, may include the sensing device generating an output value in response to a physical input (S1200); generating a probability density function of an output value in response to a physical input (S1520) and generating metadata based on the probability density function (S1540).

Upon receiving an instruction from the user via the input unit 196, the environment control unit 150 adjusts the environment inside the housing unit 170 (FIG. 3). Specifically, the environment control unit 150 controls the environment adjustment unit 172 so as to cause the environment inside the housing unit 170 to reach a target value. For example, the environment control unit 150 controls the environment adjustment unit 172 so as to cause the temperature in the housing unit 170 to reach a target temperature. Note that the environment adjustment unit 172 adjusts the environment more accurately than the sensing device 12 detects the environment. Therefore, the target value of the environment instructed by the environment control unit 150 indicates a value that is closer to the value of the actual environment inside the housing unit 170 than an output value of the sensing device 12.

When the environment inside the housing unit 170 reaches the target value, a physical amount in that environment is input to the sensing device 12. The sensing device 12 generates sensing data based on the input physical amount, and outputs the generated sensing data.

The probability density function generation unit 152 collects sensing data output by the sensing device 12. The probability density function generation unit 152 generates a probability density function of an output value of the sensing device 12 when a specific physical amount (physical amount corresponding to the environment adjusted by the environment adjustment unit 172) is input, based on the collected data and the target value of the environment inside the housing unit 170.

As a result of the environment inside the housing unit 170 being changed by the environment adjustment unit 172 (a physical amount that is input to the sensing device 12 being changed), the probability density function generation unit 152 generates a plurality of probability density functions. In this case, each of the plurality of probability density functions is a probability density function of sensing data (output value) when a specific physical amount that is different from a specific physical amount input to the sensing device 12 during generation of another probability density function included in the plurality of probability density functions is input to the sensing device 12.

The metadata generation unit 154 generates metadata based on the plurality of probability density functions generated by the probability density function generation unit 152. The metadata generated by the metadata generation unit 154 is metadata that is associated with the sensing device 12 installed in the sensing device installation unit 174 (FIG. 3).

Figure 6:
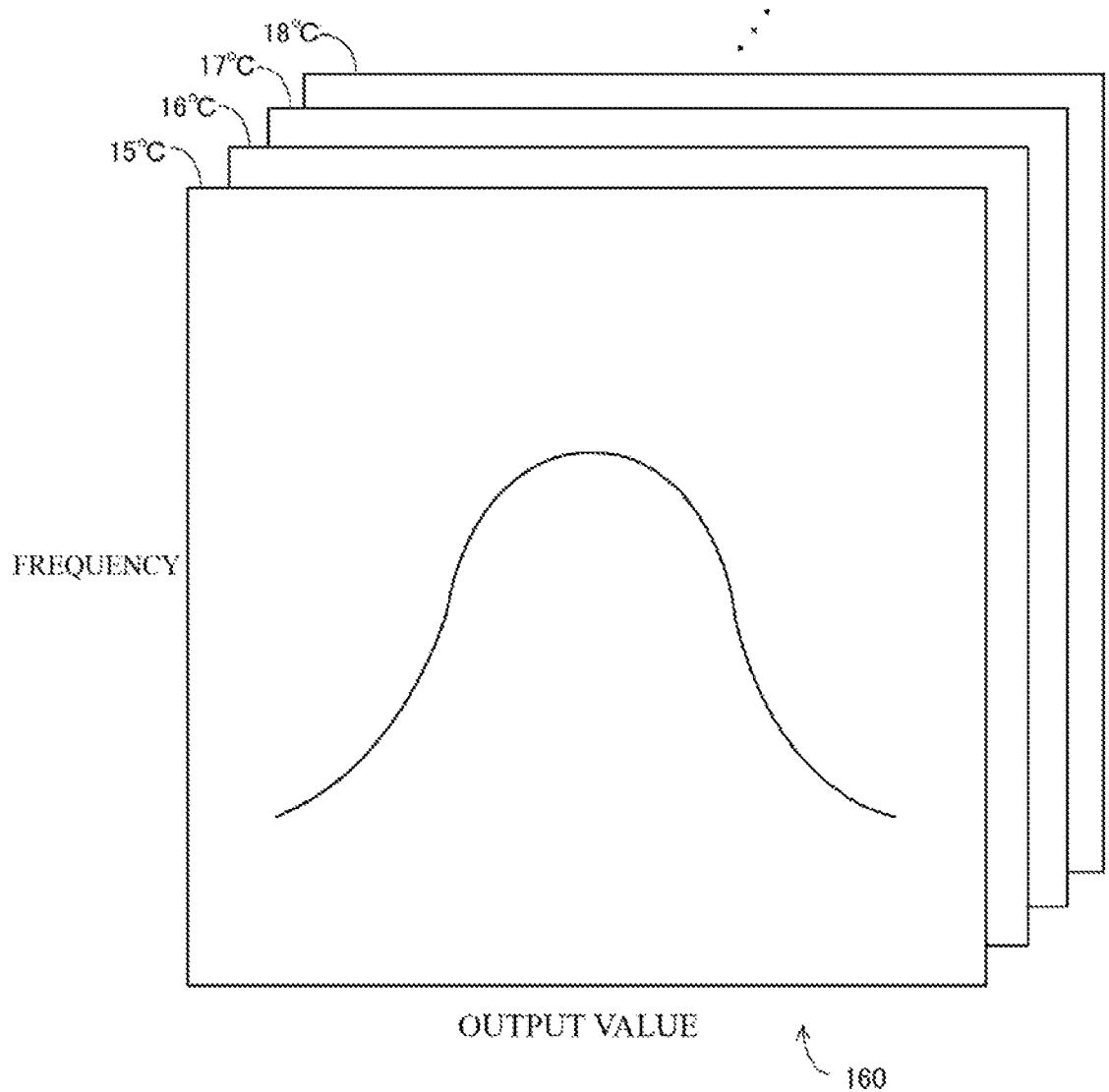
FIG. 6 is a diagram showing an example of metadata.

FIG. 6 is a diagram showing an example of metadata generated by the metadata generation unit 154. In the example in FIG. 6, the sensing device 12 is a temperature sensor. In this example, metadata 160 includes a probability density function of sensing data (an output value) when the temperature in the housing unit 170 is 15° C., a probability density function of sensing data when the temperature in the housing unit 170 is 16° C., a probability density function of sensing data when the temperature in the housing unit 170 is 17° C., and a probability density function of sensing data when the temperature in the housing unit 170 is 18° C. These probability density functions specifically indicate the input/output relationship of the sensing device 12.

Referring to FIG. 5A again, the metadata transmission unit 156 transmits metadata generated by the metadata generation unit 154 and information that can specify the sensing device 12 installed in the sensing device installation unit 174 (hereinafter, also referred to as "sensing device specifying information"), to the sensor management server 200 via the communication I/F 195. The sensing device specifying information is an ID (identification) assigned to the sensing device 12 by the sensor management server 200 in advance or an IP address of the sensing device 12, for example. The transmitted metadata is registered in the sensor management server 200 in the metadata DB 292 (FIG. 2).

2-5. Software Configuration of Sensor Management Server

Figure 7:
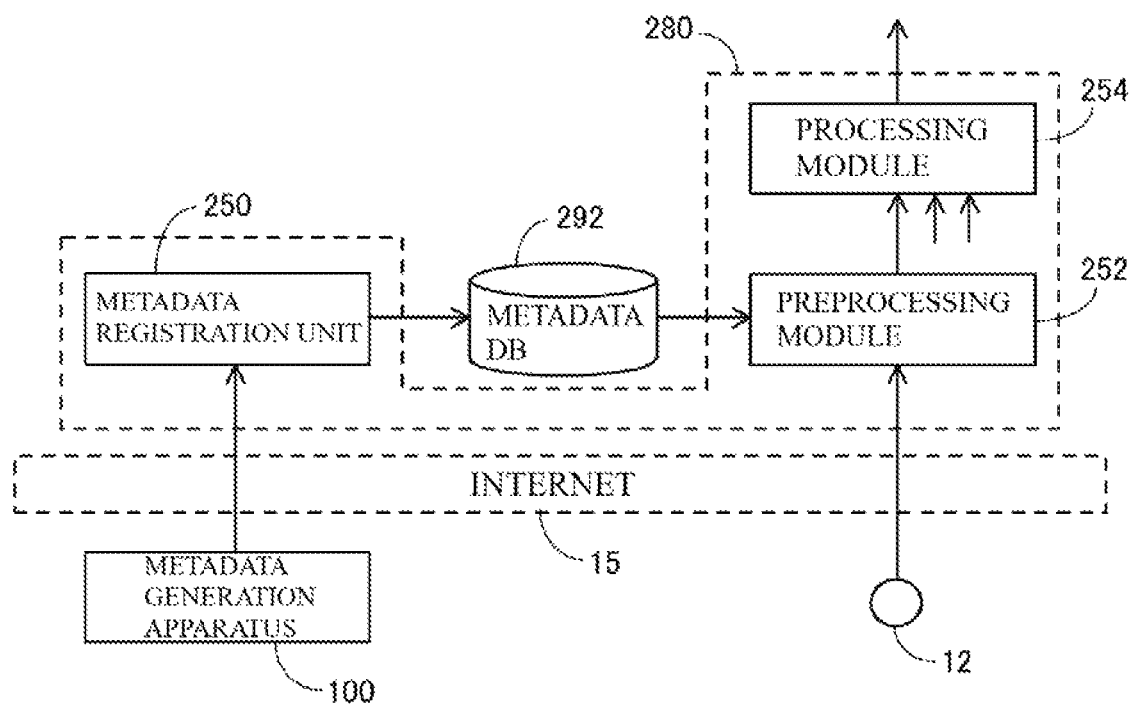
FIG. 7 is a diagram showing an example of the software configuration of the sensor management server.

FIG. 7 is a diagram showing an example of the software configuration of the sensor management server 200. In the example in FIG. 7, a metadata registration unit 250, the preprocessing module 252, and the processing module 254 are realized as a result of the control unit 280 executing the control program 291 (FIG. 4).

The metadata registration unit 250 receives metadata and sensing device specifying information from the metadata generation apparatus 100 via the Internet 15. The metadata registration unit 250 associates the received metadata with the sensing device 12 specified by the sensing device specifying information, and registers the metadata to the metadata DB 292.

The metadata registered in the metadata DB 292 is used for various uses. The metadata is used for preprocessing of input data that is input to the processing modules 254, for example.

The preprocessing module 252 reads out, from the metadata DB 292, the metadata associated with the sensing device 12 that is outputting input data to the processing module 254. The preprocessing module 252 determines whether or not it is necessary to perform preprocessing on the input data, based on the read metadata. If it is determined that preprocessing is necessary, the preprocessing module 252 performs preprocessing on the input data. A method for determining whether or not preprocessing is necessary will be described later in detail.

When preprocessing is performed on the input data by the preprocessing module 252, input data subjected to preprocessing is input to the processing module 254.

3. Operation

3-1. Metadata Generation Operation

Figure 8:
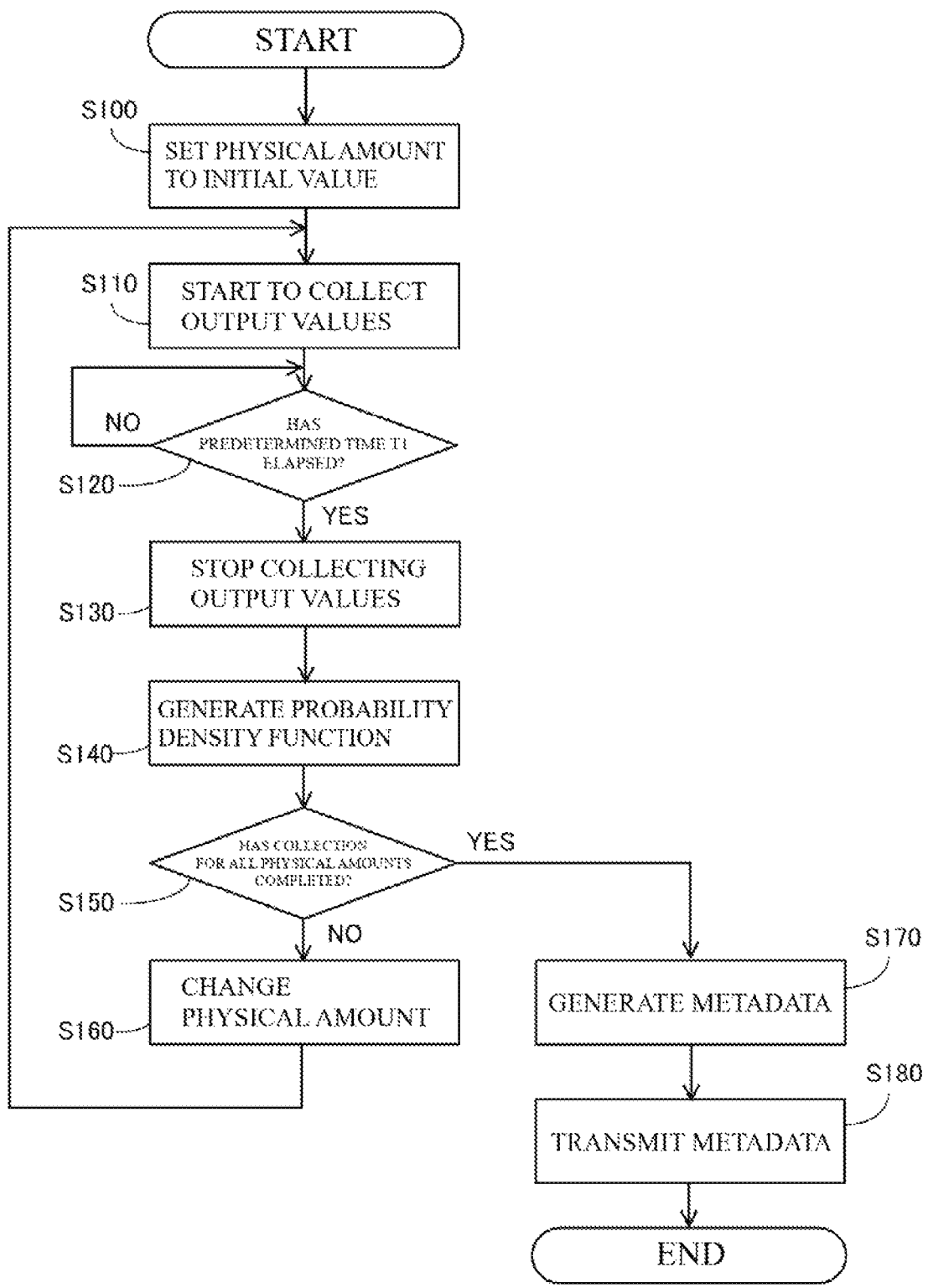
FIG. 8 is a flowchart showing an example of a metadata generation operation that is performed by the metadata generation apparatus.

FIG. 8 is a flowchart showing an example of a metadata generation operation that is performed by the metadata generation apparatus 100. The processing indicated in this flowchart is executed, for example, as a result of the control unit 180 functioning as the environment control unit 150 (FIG. 5A), the probability density function generation unit 152, the metadata generation unit 154, or the metadata transmission unit 156 upon receiving a metadata generation instruction from the user via the input unit 196 when the sensing device 12 is installed in the sensing device installation unit 174 (FIG. 3).

Referring to FIG. 8, the control unit 180 controls the environment adjustment unit 172 so as to cause a physical amount that is input to the sensing device 12 installed in the sensing device installation unit 174 to reach an initial value (step S100). The initial value of the physical amount is determined in the control program 191 (FIG. 3) in advance, for example.

The control unit 180 then starts to collect sensing data (output values) that is output by the sensing device 12 (step S110). The control unit 180 determines whether or not a predetermined time T1 has elapsed from when collection of sensing data was started (step S120). If it is determined that the predetermined time T1 has not elapsed (NO in step S120), the control unit 180 continues to collect sensing data until the predetermined time T1 elapses. Note that the predetermined time T1 is a time period during which it is possible to collect sensing data of an amount required for generating a probability density function to be described later, and is determined in the control program 191 in advance.

On the other hand, if it is determined that the predetermined time T1 has elapsed (YES in step S120), the control unit 180 stops collecting sensing data (step S130). The control unit 180 then generates a probability density function of an output value of the sensing device 12 when a physical amount (a specific physical amount corresponding to the environment adjusted by the environment adjustment unit 172) is input, based on the physical amount input to the sensing device 12 and the collected sensing data (step S140).

The control unit 180 then determines whether or not collection of sensing data for all of the predetermined physical amounts in the control program 191 has completed (step S150). In the control program 191, for example, values of a plurality of types of physical amounts that are input to the sensing device 12 are determined in advance for the respective types of sensing device 12 installed in the sensing device installation unit 174 (a temperature sensor, a humidity sensor, a sound pressure sensor, a speed sensor, an acceleration sensor, and the like). If the sensing device 12 installed in the sensing device installation unit 174 is a temperature sensor, for example, a plurality of temperatures that are input to the sensing device 12 are determined in advance in the control program 191 (e.g., determination is made in advance to change the temperature from 10 to 30° C. by steps of 1° C.).

In step S150, if it is determined that collection of sensing data for all of the physical amounts has not completed (NO in step S150), the control unit 180 controls the environment adjustment unit 172 so as to change the physical amount that is input to the sensing device 12 (step S160). The control unit 180 then repeats the processes in steps S110 to S150 until collection of sensing data for all of the physical amounts is complete.

On the other hand, if it is determined in step S150 that collection of sensing data for all of the physical amounts has completed (YES in step S150), the control unit 180 generates metadata based on a plurality of generated probability density functions. The control unit 180 controls the communication I/F 195 so as to transmit sensing device specifying information of the sensing device 12 installed in the sensing device installation unit 174 and the generated metadata, to the sensor management server 200 (step S180).

As described above, in the metadata generation apparatus 100 according to this embodiment, metadata of the sensing device 12 is generated based on a probability density function of an output value of the sensing device 12 when a specific physical amount is input. The probability density function sufficiently represents the difference in input/output relationship of sensing devices 12 that have the same model number and variation in output value of the same the sensing device 12. Therefore, with the metadata generation apparatus 100, it is possible to generate metadata that more accurately indicate the input/output relationship of each sensing device 12.

3-2. Metadata Registration Operation

Figure 9:
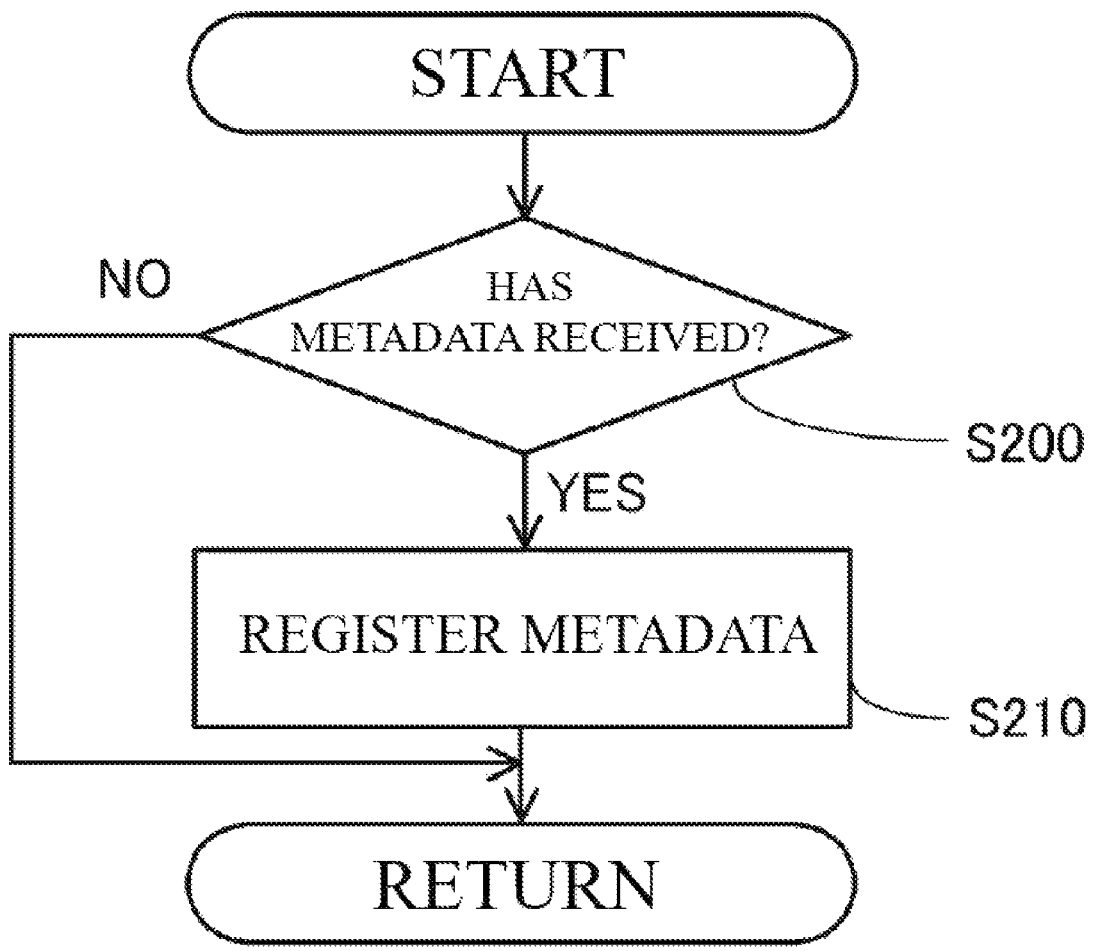
FIG. 9 is a flowchart showing an example of a metadata registration operation in the sensor management server.

FIG. 9 is a flowchart showing an example of a metadata registration operation in the sensor management server 200. The processing indicated in this flowchart is executed as a result of the control unit 280 functioning as the metadata registration unit 250 (FIG. 7) when the sensor management server 200 is operating.

As shown in FIG. 9, the control unit 280 determines whether or not metadata and sensing device specifying information have been received from the metadata generation apparatus 100 via the communication I/F 295 (step S200). If it is determined that metadata and sensing device specifying information have not been received (NO in step S200), the procedure advances to "return".

On the other hand, if it is determined that metadata and sensing device specifying information have been received (YES in step S200), the control unit 280 associates the received metadata and sensing device specifying information with each other, and registers the associated metadata and sensing device specifying information to the metadata DB 292 (step S210).

3-3. Preprocessing Operation (Use Example of Metadata)

As described above, metadata registered in the metadata DB 292 is used for various uses. Here, an example will be described in which metadata is used for preprocessing of input data that is input to the processing modules 254 (FIG. 7), as an example.

Figure 10:
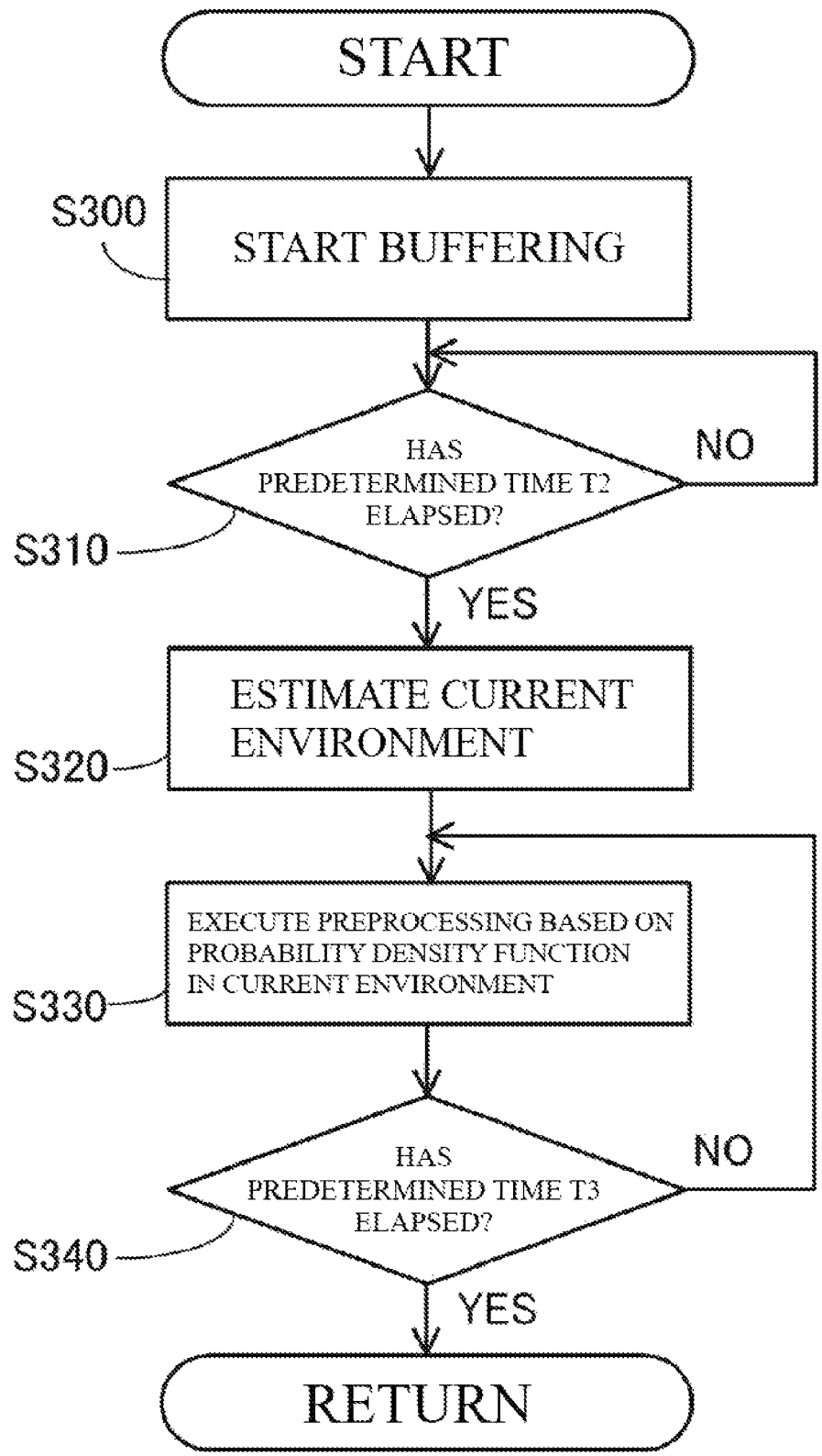
FIG. 10 is a flowchart showing an example of a preprocessing operation in the sensor management server.

FIG. 10 is a flowchart showing an example of a preprocessing operation in the sensor management server 200. The processing indicated in this flowchart is executed, for example, as a result of the control unit 280 functioning as the preprocessing module 252 when sensing data output by the sensing device 12 is input to the processing module 254.

As shown in FIG. 10, the control unit 280 starts buffering of sensing data output by the sensing device 12 (step S300). In step S300, the sensing data is temporarily stored in a partial region of the storage unit 290 (FIG. 4).

The control unit 280 determines whether or not a predetermined time T2 has elapsed from when buffering of sensing data was started (step S310). If it is determined that the predetermined time T2 has not elapsed (NO in step S310), the control unit 280 continues buffering of the sensing data until the predetermined time T2 elapses. Note that the predetermined time T2 is a time period during which it is possible to collect sensing data of an amount required for environment estimation in step S320 (to be described later), and is determined in the control program 291 in advance.

On the other hand, if it is determined that the predetermined time T2 has elapsed (YES in step S310), the control unit 280 estimates the current environment that surrounds the sensing device 12, based on the metadata associated with the sensing device 12 that is outputting input data to the processing module 254 and the buffered sensing data (step S320).

Specifically, the control unit 280 generates a probability density function of buffered sensing data, and calculates a similarity between the generated probability density function and each of the plurality of probability density functions included in the metadata. One of various known methods can be used for the similarity calculation. The control unit 280 extracts a probability density function whose similarity with the probability density function of the buffered sensing data is the highest, from the plurality of probability density functions included in the metadata. The control unit 280 estimates that the physical amount associated with the extracted probability density function indicates the current environment that surrounds the sensing device 12.

Figure 11:
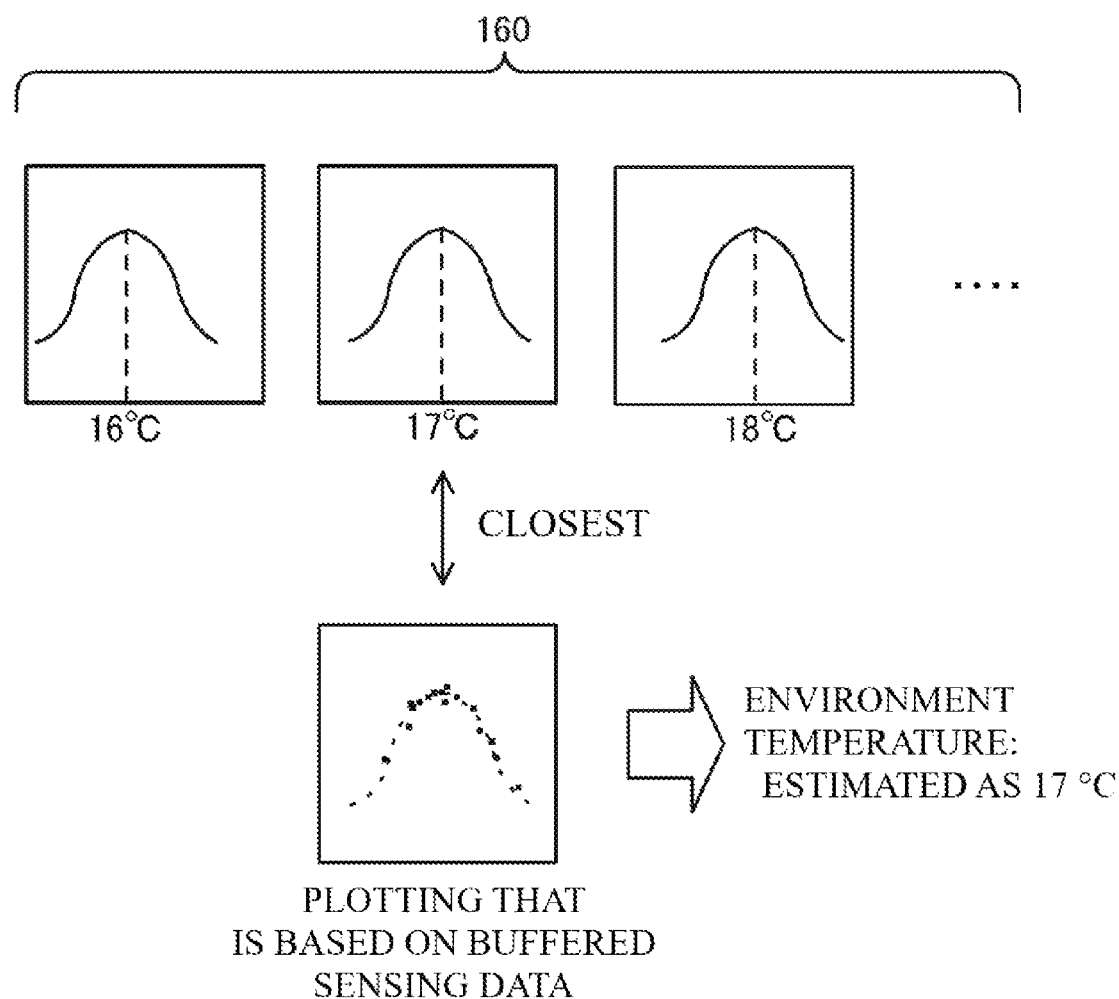
FIG. 11 is a diagram illustrating an example of a method for estimating the current environment that surrounds a sensing device.

FIG. 11 is a diagram illustrating an example of a method for estimating the current environment that surrounds the sensing device 12. In the example shown in FIG. 11, the sensing device 12 that is outputting input data to the processing module 254 is a temperature sensor. The metadata 160 includes a probability density function of sensing data when the temperature (a physical amount that is input to the sensing device 12) is 16° C., a probability density function of sensing data when the temperature is 17° C., and a probability density function of sensing data when the temperature is 18° C.

The control unit 280 generates a probability density function of buffered sensing data, and calculates a similarity between the generated probability density function and each of the plurality of probability density functions included in the metadata 160. In this example, the similarity between the probability density function of the buffered sensing data and the probability density function when the temperature is 17° C. is the highest. In this case, the control unit 280 estimates that the current temperature that surrounds the sensing device 12 is 17° C.

Referring to FIG. 10 again, when the current environment that surrounds the sensing device 12 is estimated, the control unit 280 continuously performs a determination as to whether or not preprocessing is necessary and performs preprocessing if necessary (step S330). Specifically, the control unit 280 extracts a probability density function corresponding to the environment estimated in step S320 from the plurality of probability density functions included in the metadata associated with the sensing device 12. The control unit 280 determines whether or not preprocessing is necessary, by using the extracted probability density function, and executes preprocessing if necessary.

Figure 12:
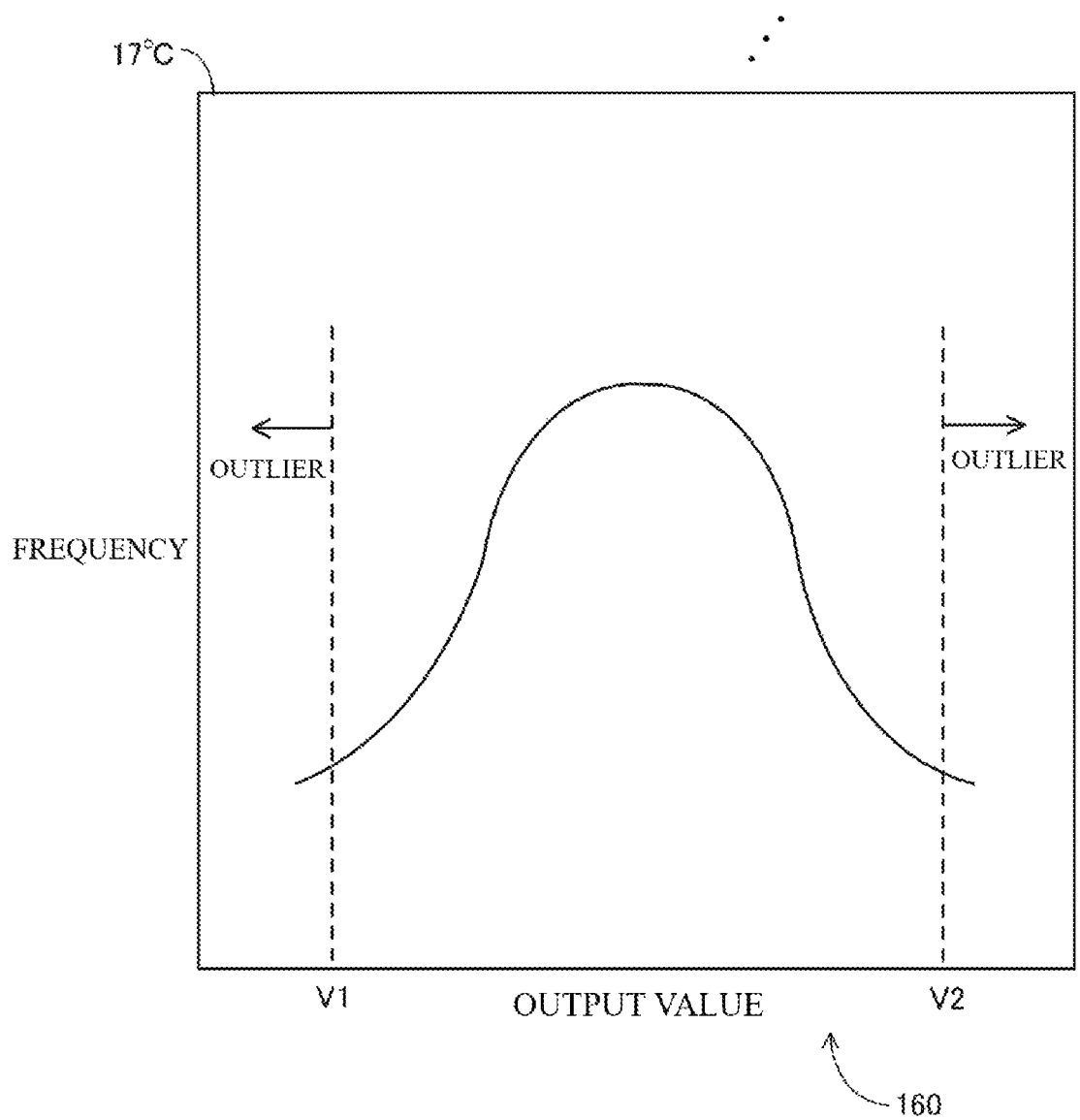
FIG. 12 is a diagram illustrating an example of a method for determining whether or not preprocessing is necessary and a preprocessing method.

FIG. 12 is a diagram illustrating an example of a method for determining whether or not preprocessing is necessary and preprocessing. In this example, in the metadata 160, an output value that is smaller than or equal to V1 or larger than or equal to V2 is determined to be an outlier in advance. These outlier references (V1, V2) are determined by the control unit 180 (FIG. 3) when the metadata 160 is generated, for example. It is determined in advance that, in the control program 191 that is executed by the control unit 180, for example, an output value whose appearance frequency (probability) is smaller than a predetermined value is regarded as an outlier.

The control unit 280 can regard an output value that is smaller than or equal to V1 and larger than or equal to V2 as an outlier, by referring to the probability density function corresponding to the current environment (temperature: 17° C.). Therefore, if sensing data output by the sensing device 12 is smaller than or equal to V1 or larger than or equal to V2, the control unit 280 determines that the sensing data is an outlier, and that preprocessing is necessary. If the sensing data is an outlier, the control unit 280 erases the outlier as preprocessing, for example.

Referring to FIG. 10 again, the control unit 280 then determines whether or not a predetermined time T3 has elapsed from when the process in step S330 was started (step S340). If it is determined that the predetermined time T3 has not elapsed (NO in S340), the control unit 280 continues determination as to whether or not preprocessing is necessary and preprocessing if necessary, until the predetermined time T3 elapses. Note that the predetermined time T3 is a time period during which the environment estimated in step S320 hardly changes, and is determined in the control program 291 in advance. On the other hand, if it is determined that the predetermined time T3 has elapsed (YES in step S340), the processing advances to "return".

As described above, in the sensor management server 200, metadata associated with the sensing device 12 (a probability density function) is used for determination as to whether or not preprocessing of input data that is input to the processing module 254 is necessary, for example. In the sensor management server 200, it is possible to easily determine whether or not preprocessing is necessary, for example, by using the reference values (V1, V2 (FIG. 12)) for determining whether or not sensing data is an outlier, the reference values being included in the metadata.

4. Features

As described above, in the metadata generation apparatus 100 according to this embodiment, metadata of the sensing device 12 is generated based on a probability density function of an output value of the sensing device 12 when a specific physical amount is input. The probability density function sufficiently represents the difference in input/output relationship of sensing devices 12 that have the same model number and variation in an output value of the same the sensing device 12. Therefore, with the metadata generation apparatus 100, it is possible to generate metadata that more accurately indicates the input/output relationship of the sensing devices 12.

Note that the sensing device 12 is an example of a "sensing device" according to the present invention, and the metadata generation apparatus 100 is an example of a "metadata generation apparatus" according to the present invention. The probability density function generation unit 152 is an example of a "probability density function generation unit" according to the present invention, and the metadata generation unit 154 is an example of a "metadata generation unit" according to the present invention. The environment control unit 150 is an example of a "physical amount specifying unit" according to the present invention.

5. Modified Examples

The embodiment has been described, but the present invention is not limited to the above embodiment, and various modifications can be made without departing from the spirit thereof. Modified examples will be described below. However, the following modified examples can be combined as appropriate.

5-1

In the above embodiment, a probability density function of an output value of the sensing device 12 when a specific physical amount is input is used as metadata. However, the probability density function itself does not necessarily need to be used as metadata. The control unit 180 generates a probability density function, and determines outlier references (V1 and V2 in FIG. 12) based on the generated probability density function, for example. The control unit 180 may use the generated outlier references as metadata.

5-2

In addition, according to the above embodiment, the metadata generation apparatus 100 is provided in addition to the sensing device 12. However, the metadata generation apparatus 100 does not necessarily need to be separated from the sensing device 12. The sensing device 12 and the metadata generation apparatus 100 may also be integrated, for example. That is to say, the sensing device 12 may also have a function of generating metadata. In this case, the sensing device 12 is installed in the sensing device installation unit 174 in advance, for example. During generation of metadata, a sealed space is formed in the housing unit 170. On the other hand, after metadata is generated, the housing unit 170 is opened, and the sensing device 12 can observe the surrounding environment (environment outside of the housing unit 170).

5-3

In addition, according to the above embodiment, metadata is generated when the sensing device 12 is sealed in the housing unit 170. However, metadata does not necessarily need to be generated when the sensing device 12 is sealed in the housing unit 170. Metadata may also be generated when the sensing device 12 is installed in an actual use environment, for example.

In this case, the metadata generation apparatus 100 does not include the housing unit 170, for example. Instead, the metadata generation apparatus 100 includes a sensor (reference device) that is more accurate than the sensing device 12 for which metadata is to be generated. The accuracy of environment detection of this sensor is higher than that of the sensing device 12 by an order of magnitude, for example. The control unit 180 continues collecting physical amounts detected by this sensor and collecting sensing data generated by the sensing device 12, for a predetermined time period, for example.

The control unit 180 associates a physical amount and sensing data collected at the same timing, with each other. The control unit 180 generates a plurality of probability density functions of output values of the sensing device 12 when specific physical amounts are input, based on the collected physical amounts and sensing data. Note that each of the probability density functions is a probability density function of an output value when a different physical amount is input to the sensing device 12. The control unit 180 then generates metadata based on the plurality of generated probability density functions.

If metadata is generated using such a method, metadata is generated based on sensing data in the actual use environment, and thus it is possible to generate metadata indicating the input/output relationship of the sensing device 12 in the actual use environment.

5-4

In addition, in the above embodiment, processing that is performed by the sensor management server 200 may also be realized by a plurality of servers and the like.

LIST OF REFERENCE NUMERALS

10 Sensor network system
11 Sensor network adopter
12 Sensing device
14 Sensor network unit
15 Internet
100 Metadata generation apparatus
150 Environment control unit
152 Probability density function generation unit
154 Metadata generation unit
156 Metadata transmission unit
160 Metadata
170 Housing unit
172 Environment adjustment unit
174 Sensing device installation unit
180, 280 Control unit
182, 282 CPU
184, 284 RAM
186, 286 ROM
190, 290 Storage unit
191, 291 Control program
195, 295 Communication I/F
196 Input unit
197 Output unit
198, 298 Bus
200 Sensor management server
250 Metadata registration unit
252 Preprocessing module
254 Processing module
292 Metadata DB
300 Application server

The invention claimed is:

1. A metadata generation apparatus configured to generate metadata that is associated with a sensing device,
   wherein the sensing device is configured to generate an output value based on a physical amount that is input, and
   the metadata generation apparatus comprises:
   a probability density function generation unit configured to generate a probability density function of an output value in response to a specific physical amount being input to the sensing device, and
   a metadata generation unit configured to generate metadata based on the probability density function.

2. The metadata generation apparatus according to claim 1,
   wherein the probability density function generation unit is configured to generate a plurality of probability density functions, and
   each of the plurality of probability density functions is a probability density function of an output value in response to a specific physical amount that is different from a specific physical amount input to the sensing device in response to another probability density function included in the plurality of probability density functions was generated is input to the sensing device.

3. The metadata generation apparatus according to claim 1, further comprising:
   a physical amount specifying unit configured to specify a physical amount that is input to the sensing device more accurately than the sensing device, wherein the probability density function generation unit is configured to generate a probability density function based on the physical amount specified by the physical amount specifying unit and an output value.

4. The metadata generation apparatus according to claim 1,
wherein the sensing device is installed in an actual use environment.

5. The metadata generation apparatus according to claim 2, further comprising:
a physical amount specifying unit configured to specify a physical amount that is input to the sensing device more accurately than the sensing device,
wherein the probability density function generation unit is configured to generate a probability density function based on the physical amount specified by the physical amount specifying unit and an output value.

6. The metadata generation apparatus according to claim 2,
wherein the sensing device is installed in an actual use environment.

7. The metadata generation apparatus according to claim 3,
wherein the sensing device is installed in an actual use environment.

8. The metadata generation apparatus according to claim 5,
wherein the sensing device is installed in an actual use environment.

9. A metadata generation method for generating metadata that is associated with a sensing device,
wherein the sensing device is configured to generate an output value based on a physical amount that is input,
the metadata generation method comprises:
generating a probability density function of an output value in response to a specific physical amount being input to the sensing device, and
generating metadata based on the probability density function.

10. A non-transitory computer-readable storage medium storing a program that causes a computer to execute processing for generating metadata that is associated with a sensing device,
wherein the sensing device is configured to generate an output value based on a physical amount that is input,
the program is configured to, which when read and executed, cause the computer to perform operations comprising:
generating a probability density function of an output value in response to a specific physical amount being input to the sensing device, and
generating metadata based on the probability density function.

* * * * *